Aug. 14, 1962 J. V. BERTRAND 3,049,370
HIGH TEMPERATURE SEAL ASSEMBLY
Filed Oct. 9, 1959 3 Sheets-Sheet 3
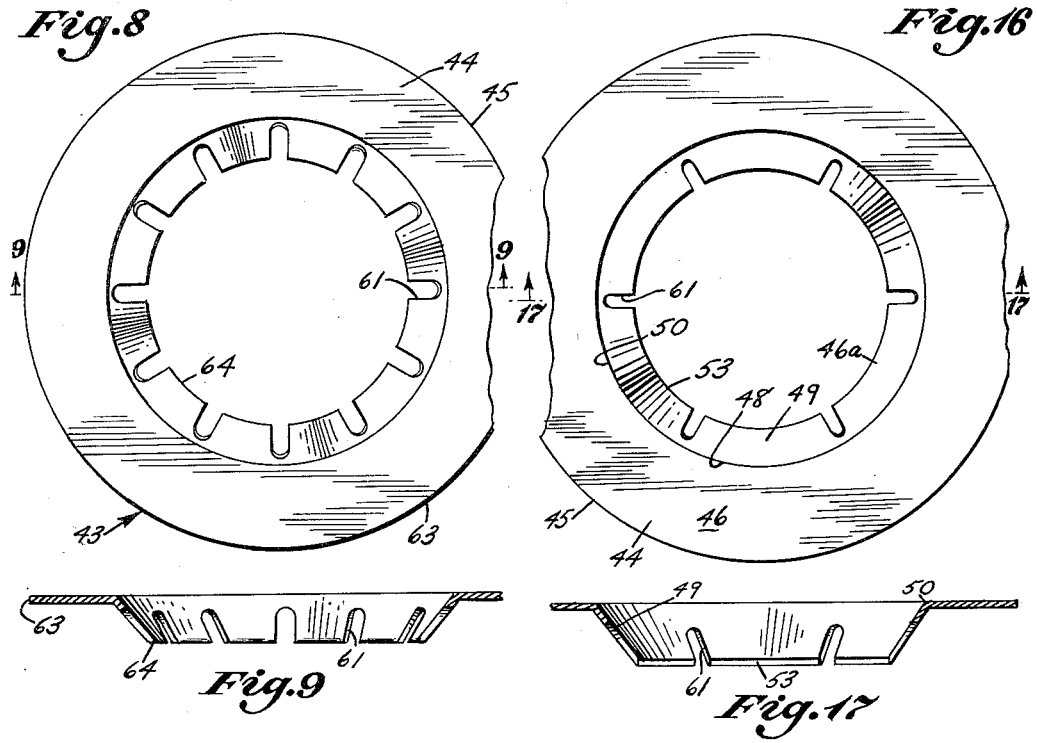
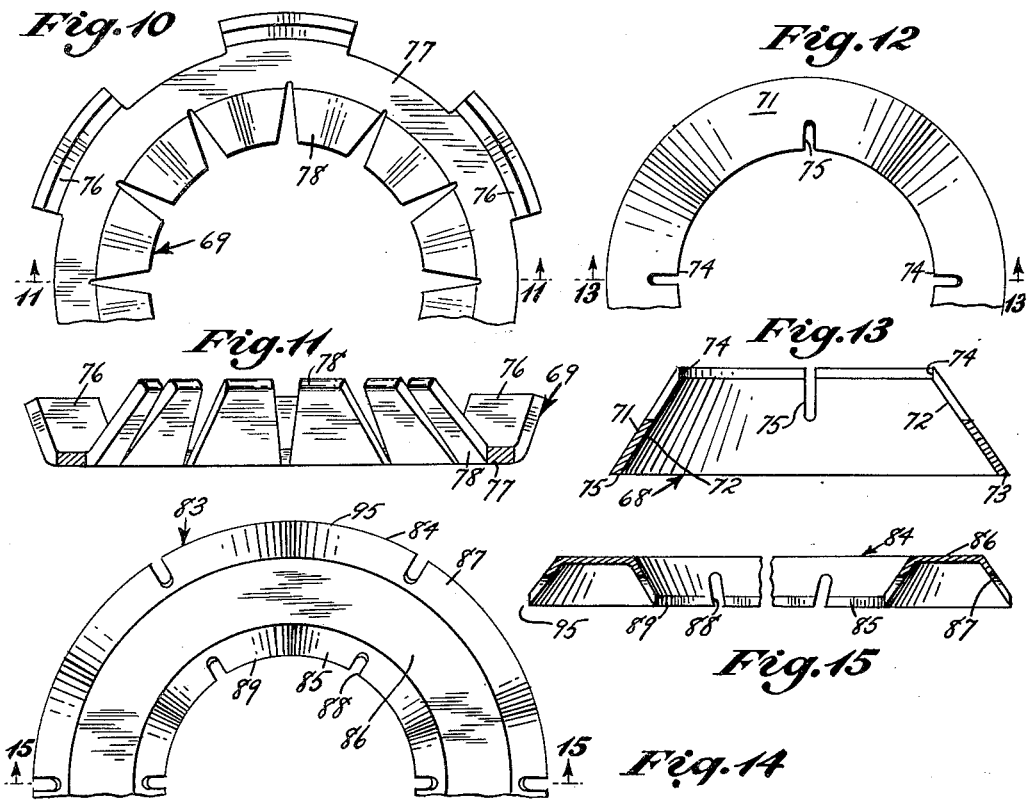

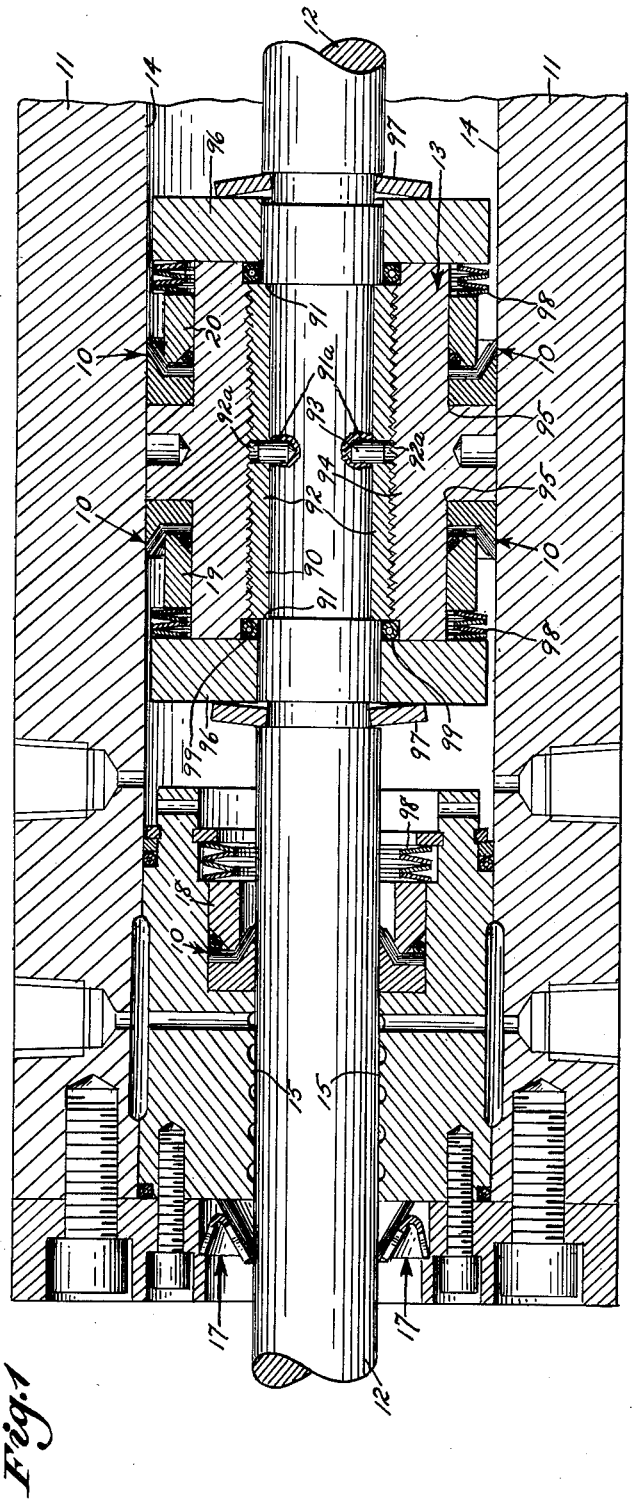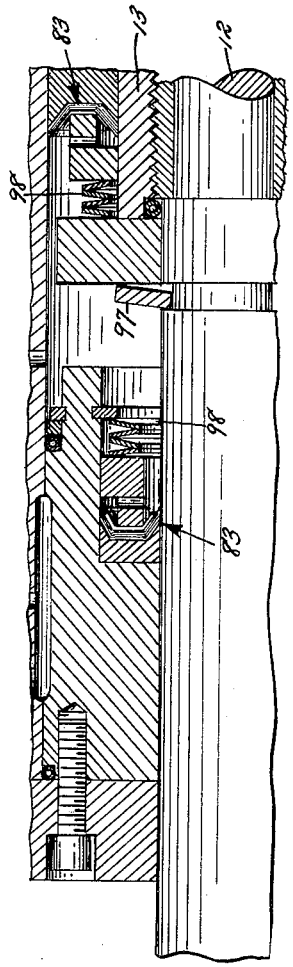

United States Patent Office 3,049,370
Patented Aug. 14, 1962

3,049,370
HIGH TEMPERATURE SEAL ASSEMBLY
Joseph V. Bertrand, 59 Forest Ave., Verona, N.J.
Filed Oct. 9, 1959, Ser. No. 845,456
3 Claims. (Cl. 277—188)

This invention relates generally to sealing devices of types having particular application for the sealing of moving cylindrical objects within correspondingly shaped cylindrical bores, as for example, the sealing of a piston or moving rod within a cylinder block or similar devices. The invention has particular application for use in situations where very high temperature and hydraulic pressures are encountered, as in the case in aircraft, missiles and the like.

The problem of adequately sealing between a piston or piston rod at temperatures in the vicinity of 1000° F. is very difficult, and particularly so when the required working pressure of the system is of the order of several thousand pounds per square inch. In the prior art, difficulty has been encountered in obtaining a proper seal so as to prevent the escape of fluid or gaseous media from the pressure area. When using materials capable of withstanding high temperatures, relative inelasticity between the parts is encountered which requires not only machining to close tolerances but allows little expansion of the materials to assist in effecting the necessary seal. It is known in the art to use a series of precision split parts which are closely fitted together, or in the alternative to use parts depending upon an initial interference fit. The seals employing split parts are known for their inability to seal thoroughly, while those depending upon an interference fit have proven to be impractical because of the close manufacturing tolerances required and the high stresses and contact pressures created at the sealing surface. In addition, the high temperature environment is detrimental to the satisfactory function of the interference seal because of the resulting expansion of the piston rod and other restraining surfaces in contact with the seal. This, in turn, is further aggravated by interference, a problem which is severe even at normal temperatures. Such conditions, in the past, have lead to rapid wear of the seal and rod or piston with a consequent short useful life.

It is therefore among the principal objects of the present invention to provide an improved high temperature seal of the class described in which the above mentioned disadvantages have been substantially eliminated.

Another object of the invention lies in the provision of an improved high temperature seal which may provide adequate, but at no time excessive bearing pressure upon the sealing surface.

Another object of the invention lies in the provision of an improved seal capable of operating with a minimum of wear and abrasion upon the sealing surface thereof to provide a relatively long useful life.

Still another object of the invention lies in the provision of a seal assembly occupying relatively little space, thereby permitting its use in limited quarters.

A feature of the invention lies in the provision of a seal assembly as a package or cartridge unit which may be readily inserted and removed from a cylinder assembly without damage of the components while maintaining close centering tolerances essential to adequate sealing.

A feature of the invention lies in the elimination of possible damage during assembly due to overtightening.

Another feature lies in the fact that internal friction resulting from movement of the piston or rod with respect to the cylindrical bore is maintained at a minimum owing to the presence of lower pressures provided by the seal assembly, and as a result, the danger of scraping lubrication from the rod or piston is eliminated.

Another feature of the invention lies in the provision of a novel scraping means for removing carbonized solids and other foreign material which may form during operation upon the rod or piston with a resultant increase of seal life.

Another feature of the invention lies in the provision of an improved configuration to acquire better seating of the seal elements, and having a superior sealing action as compared with the prior art.

These objects and features, as well as other incidental ends and advantages will more fully appear in the progress of the following disclosure, and be pointed out in the appended claims.

In the drawings, to which reference will be made in the specification, similar reference characters have been employed to designate corresponding parts throughout the several views.

FIGURE 1 is a fragmentary sectional view showing typical assemblies of the inventive structure in a high temperature piston-cylindrical bore installation.

FIGURE 2 is a fragmentary sectional view showing a modified form of inventive structure in a similar installation.

FIGURE 8 is a fragmentary plan view showing one of the reeds which comprises a part of the seal assembly.

FIGURE 9 is a fragmentary sectional view as seen from the plane 9—9 in FIGURE 8.

FIGURE 10 is a fragmentary plan view showing one of the components of the scraper means employed in conjunction with the seal assembly.

FIGURE 11 is a sectional view as seen from the plane 11—11 on FIGURE 10.

FIGURE 12 is a fragmentary plan view showing another member of the scraper means.

FIGURE 13 is a sectional view as seen from the plane 13—13 in FIGURE 12.

FIGURE 14 is a fragmentary plan view showing a form of reed employed in the seal assemblies shown in FIGURE 2.

FIGURE 15 is a sectional view as seen from the plane 15—15 in FIGURE 14.

FIGURE 16 is a fragmentary view in elevation showing another of the reeds which comprises a part of the embodiment.

FIGURE 17 is a central sectional view as seen from the plane 17—17 in FIGURE 16.

Figure 3:
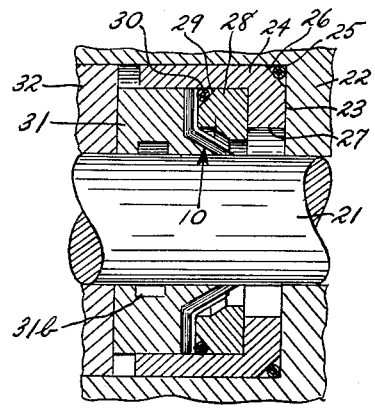
FIGURE 3 is a fragmentary enlarged central sectional view showing a modified cartridge-type installation of seal assembly construction employed in FIGURE 1.

In accordance with the first embodiment of the invention, a plurality of devices, generally indicated by reference character 10, are shown in installed condition in FIGURE 1 to illustrate a typical application. A cylinder block 11 is provided with a rod 12 upon which a piston 13 is mounted, the same being arranged for reciprocation within a cylindrical bore 14. The rod is further supported within a guide bushing 15, and it may be assumed that pressure differentials exist on both sides of the piston 13 at different portions of a cycle of operation. Static seals are provided by pressure O rings well known in the art. Scraper means 17, to be described in greater detail at a later point in this disclosure may be optionally employed, depending upon the specific type of installation. In the type of installation shown in FIGURE 1, seal retaining means 18, 19 and 20 are employed to facilitate original installation and servicing or replacement, or cartridges of the types shown in FIGURES 3 and 4 may be used.

Referring to FIGURE 3, in the drawing, there is disclosed an enlarged view of a typical preassembled cartridge as installed within a relatively fixed part 22 of the guide bushing. The guide bushing is provided with a recess 23 into which is inserted a first or outer static seal retaining member 24, in which a pressure O ring 25 is positioned within a triangularly shaped recess 26. The member 24 includes a bore 27 adequately sized to permit clearance of the shaft 21. A second inner static seal member 28 is disposed within the member 24, and is provided with a second triangular recess 29 in which a pressure O ring 30 is disposed. The members 28 and 31 form a clamp for the device 10, as will more fully appear hereinafter. A third seal member or backup ring 31 forms the other half of the clamping means for the device 10, the same being urged into proper position by a guide bushing 32 which surrounds the shaft 21. The member 31 is provided with a groove 31b to allow access to a disassembling tool (not shown).

The specific quantity, sequential arrangement and combination of the reeds described may be varied in accordance with requirements. However, one combination tested successfully from 0 to over 3000 pounds per square inch pressure is shown in greater detail in FIGURES 3 and 5. These figures show an assembly 10 which is inserted between members 28 and 31. Commencing at the bottom of FIGURE 5 or lefthand portion of FIGURE 3, there is provided a first continuous reed 34, followed by a first washer or spacing member 35, a second reed 36, generally similar to the first reed 34, a second washer or spacer 37, a third reed 38, a third washer 39, a fourth reed 40, a fourth washer 41, a fifth notched or split reed 42b, and a resilient compressing member 43. The members 34—43 are preferably formed from alloy steel having a substantial degree of hardness and relatively great resistance to flow or carbonization under the heat of operation to which they will be subjected. For applications of approximately 1000 degrees F., I have found metals currently sold under the tradename of Inconel X to be suitable. To provide a more intimate contact surface between sealing members, as well as an improved seal, the contact surfaces between sealing members should be of dissimilar materials. I have found that a soft heat-resisting metal such as silver, gold or the like is desirable for this purpose. Successful results have been obtained in which all reeds shown in FIGURE 5 have been of Inconel X metal except the aforementioned reeds 36 and 40, which are preferably formed from solid silver. Excellent results may also be obtained by having all members made of Inconel X metal with the undersurface of each coated with silver to a thickness of approximately .0001 inch.

The specific dimensions of the various parts may be varied according to design, but as an example, where a one-half inch diameter shaft or piston rod is to be sealed, the reeds 34, 36, 38, 40, 42 and 42b are preferably stamped from material with an overall thickness approximating .005 inch. They are all substantially equally-sized, each including an outer peripheral edge 45, a first or lower surface 46, a second or upper surface 47, and an edge 48 which defines a base portion 44. A frustoconical portion 49 is formed integrally from the same stamping, the same including an outer edge 50 coterminous with the inner edge 48, a first or lower surface 51, a second or upper surface 52 and a shaft sealing edge 53.

Figure 6:
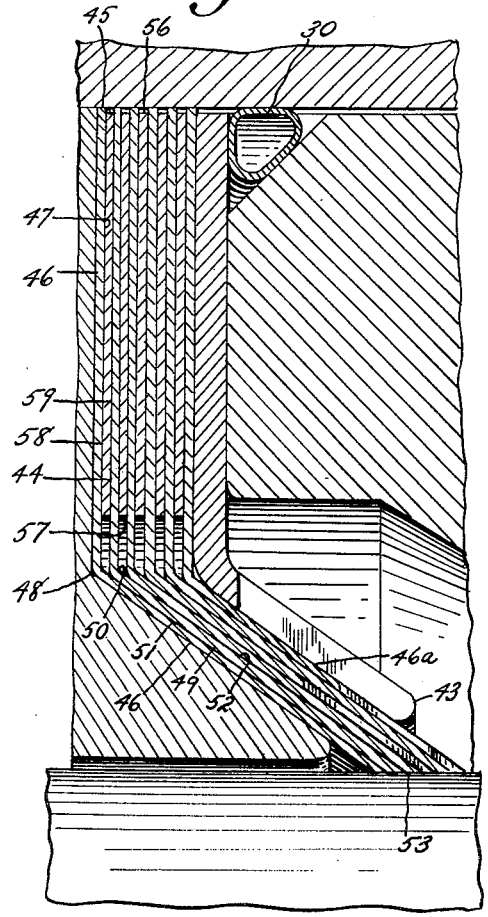
FIGURE 6 is a much enlarged sectional view corresponding to the upper central portion of FIGURE 3.
Figure 7:
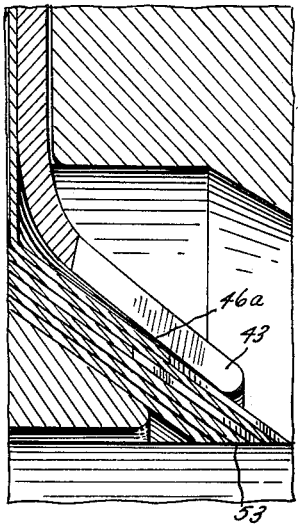
FIGURE 7 is a much enlarged sectional view corresponding to that seen in FIGURE 6, but showing the relative position of the component parts immediately before final tightening action.

The washers or spacing members 35, 37, 39, 41 and 42a are formed of materials approximately .003 inch thick overall, each including an outer peripheral edge 56, an inner peripheral edge 57, a first or lower surface 58 which may be plated with silver with a thickness of .0001 inch, and a second surface 59 preferably unplated. As best seen in FIGURE 6, it will be observed that the outer peripheral edges 56 are spaced inwardly of the outer peripheral edges 45 of the reed, and the inner peripheral edges 57 are spaced from the edges 50. The thickness of the washer or spacing members is such as to permit a slight compression of the frustoconical portions 49 of the reeds when assembled, without permitting distortion of the same under such compression.

Figure 5:
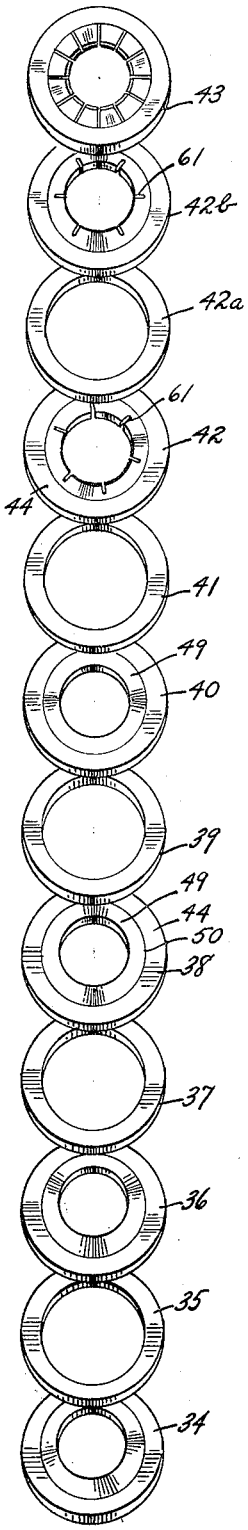
FIGURE 5 is an exploded view in perspective showing the various reeds and washers employed in the seal assembly.

The fifth and sixth slotted reeds 42 and 42b, respectively are also of .005 inch thickness overall, and except for the presence of the slots 61, the configuration of the same is generally similar to the other reeds. The sixth slotted reed 42b is placed over the fifth slotted reed 42 so that the slots of each are disaligned, as best seen in FIGURE 5.

The resilient compressing member 43 serves to resiliently push the frustoconical portions 46 centripetally, and may be formed of Inconel metal approximately .012 inch thick. The outer edge 63 is of a diameter corresponding to that of the washers 35, 37 etc., while the inner edge 64 is rounded to be spaced a considerable distance from the sealing edges 53, as best seen in FIGURE 6. This edge is rounded to avoid any possibility of scratching any of the reeds with which it may come into contact. The midsection of the land portion of member 43 is assembled directly over a slot in the member 42b, in the same type of staggered relation as exists between members 42 and 42b. This relation is best seen in FIGURE 5.

Prior to assembly in the location in which it will perform a sealing function, the members 34—42b are completely assembled in a jig fixture (not shown) and are carefully lapped to close tolerances, using a lapping stone the same dimension as the shaft 12 or 21. When the device is installed, the reeds are so positioned that the frustoconical portions 49 are spaced toward the higher pressure differential, so that pressure will contact the upper surfaces of the frustoconical portions to assist the compressing member 43 in urging the sealing edges 53 which are now in abutted relation against the outer surface of the shaft 12 or 21. Where the pressure differential is of a relatively low order, little assistance will be given to the compressing member 42, and a consequent lower sealing pressure will result. As the pressure differential builds up, the pressure is employed to further compress the sealing edges, so that the sealing pressure bears a definite relation to the amount of pressure differential existing, whereby needless high pressure upon the sealing surfaces is avoided.

To prevent relative rotation of members 42, 42b and 43, it is possible to weld, braze or silver-solder the members on the periphery of the flange area, care being taken to prevent any interconnection on the conical area.

Figure 4:
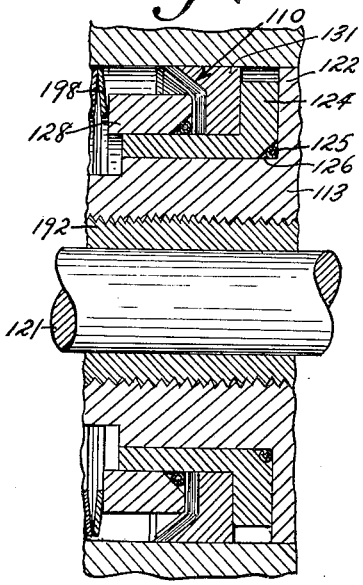
FIGURE 4 is a fragmentary enlarged central sectional view showing a second modified cartridge-type installation of seal assembly construction employed in FIGURE 1.

Referring to FIGURE 4 in the drawing, there is shown a seal of the external type, as contrasted with the internal type of FIGURE 3. Parts are generally similar, and accordingly, those corresponding to similar parts in FIGURE 3 have been designated by similar reference characters with the additional prefix "1."

Referring to the lefthand portion of FIGURE 1 and FIGURES 10 to 13, inclusive, the scraper means 17 may be optionally included in those installations where an accumulation of grit, carbonized particles formed by wear, solidified hydrocarbons, and the like may be expected to accumulate under high temperature operating conditions. As the device 10 requires a very accurate seal which can be damaged by such materials, the scraper means 17 provides for the removal of such material as the shaft 12 reciprocates.

The scraping means 17 (see FIGURES 10 to 13, inclusive) includes a plurality of scaper members 68 and a resilient compressor member 69.

The scraper members 69 are frustoconical in configuration, and include an outer surface 71, an inner surface 72, an outer edge 73 and an inner edge 74 which may be lapped as above described. Slitted portions 75 are provided for additional resilience, and as none of the scraping surfaces of the members 68 are of continuous configuration, the slitted portions 75 are preferably overlapped so that the entire surface of the shaft 12 or 21 may be contacted during reciprocation of the same.

The resilient compressor member 69 includes a plurality of outer resilient segments 76, a radially disposed member 77 and a plurality of inner resilient segments 78 which are adapted to press upon the outer surface 71 of the members 68. As the function of the means 17 is purely a scraping or cleaning action, the close tolerances required in the case of the devices 10 are not necessary, it being sufficient that a smooth light resilient contact is obtained on the outer surface of the shaft 12 or 21 to remove foreign matter, as well as to provide a wiping and spreading action for lubrication disposed on the outer surface of the shaft.

Turning now to the alternate form of the invention as illustrated in FIGURES 2 and 14 and 15, the device, generally indicated by reference character 83 includes a plurality of reeds 84 which are used in conjunction with washer members (not shown) similar to the washer member 35. The reeds 84 of the second embodiment differ from those of the first embodiment in that they include in addition to the first conical portion 85 and planar portion 86 a second conical portion 87 which performs a function similar to the inner conical portion 85. The slotted portions 88 may be omitted for certain of the reeds as is the case in the principal form, and both the inner edge 89 and the outer edge 95 are carefully lapped in the manner above described. As best seen in FIGURE 2, the provision of the outer conical portion 87 permits the elimination of certain of the O rings used in the first embodiment.

Referring again to FIGURE 1, the piston 13 is interconnected with shaft 12 in a novel manner which facilitates assembly of the component parts of the device within the cylinder 11. The shaft 12 is provided with an undercut portion 90 having shoulders 91, and holes 91a onto which is fitted a split threaded bushing 92. Pins 93 extend from holes 91a into corresponding holes 92a in the bushing 92 for anchoring the position of the same thereon and preventing rotation therebetween. The piston body 94 is threadedly engaged upon the bushing, in such manner that thrust transmitted to the piston body is transferred to the shoulders 91. The piston body 94 includes recesses 95 for sealing devices 10, while piston end members 96 are maintained in position by snap rings 97 which exert a resilient force against the outer surfaces of the piston end members 96, but which carry no load thrust. The piston end members 96 serve to cover the recesses 95, which are provided with belleville washers 98 or similar resilient structure for maintaining the seals 10 or 83 in position. O-ring seals 99 of well known type provide an additional seal at the shoulder portions 91 to prevent loss of pressure between the piston body 94 and the shaft 12.

It may thus be seen that I have invented novel and highly useful improvements in high temperature sealing devices in which the sealing pressure may be varied in accordance with the pressure attempting to pass the seal. This construction permits a minimum distortion of the sealing material which may be well within the elastic limits of the material being employed, with a resultant lowering of the galling and wear occurring to the sealing material during the operation, and a consequent increase in the useful life of the seal assembly. While I have disclosed a seal assembly having an optimum number of sealing members for certain conditions, it will be understood that more or less of the sealing reeds may be employed in any one assembly as required by the particular application.

While it is possible to increase the number of reeds in a given assembly, it must be borne in mind that the sealing assembly itself provides to a degree a wiping action, and the excessive use of reeds, can, in certain instances, result in the complete removal of all lubrication upon the shaft, thereby increasing wear and subsequent leakage.

I wish it to be understood that I do not consider the invention limited to the precise details of structure shown and set forth in this specification, for obvious modifications will occur to those skilled in the art to which the invention pertains.

I claim:

1. A high temperature seal for use in sealing a cylindrical solid with respect to a cylindrical bore comprising: a plurality of thin reeds, each including a planar disc portion having a central opening and defining inner and outer peripheral edges, a frustoconical portion interconnected to at least one of said peripheral edges and having a free edge thereon, a plurality of disc-like spacer elements each corresponding generally to the disc portions of said reeds, said reeds being juxtaposed with their conical portions in direct contact to abut said free edges, said spacer elements being positioned between adjacent reeds, the free edges of said frustoconical portions being lapped to form a continuous surface.

2. A high temperature seal for use in sealing a cylindrical solid with respect to a cylindrical bore comprising: a plurality of thin reeds, each including a planar disc portion having a central opening and defining inner and outer peripheral edges, a frustoconical portion interconnected to one of said peripheral edges and having a free edge thereon, a plurality of disc-like spacer elements each corresponding generally to the disc portions of said reeds, said reeds being juxtaposed with their conical portions in direct contact to abut said free edges, said spacer elements being positioned between adjacent reeds, the free edges of said frustoconical portions being lapped to form a continuous surface.

3. A high temperature seal for use in sealing a cylindrical solid with respect to a cylindrical bore comprising: a plurality of thin reeds, each including a planar disc portion having a central opening and defining inner and outer peripheral edges, a pair of frustoconical portions interconnected to said inner and outer peripheral edges and each having free edges thereon, a plurality of disc-like spacer elements each corresponding generally to the disc portions of said reeds, said reeds being juxtaposed with their conical portions in direct contact to abut said free edges, said spacer elements being positioned between adjacent reeds, the free edges of said frustoconical portions being lapped to form a continuous surface.

References Cited in the file of this patent

UNITED STATES PATENTS

| | | |
|---|---|---|
| 1,506,018 | Lyman | Aug. 26, 1924 |
| 1,554,536 | Tartrais | Sept. 22, 1925 |
| 2,226,273 | Westefeldt | Dec. 24, 1940 |
| 2,576,025 | MacClatchie | Nov. 20, 1951 |
| 2,599,082 | Wells | June 3, 1952 |
| 2,772,931 | Biedermann | Dec. 4, 1956 |
| 2,822,227 | Droitcour et al. | Feb. 4, 1958 |

FOREIGN PATENTS

| | | |
|---|---|---|
| 18,835 | Great Britain | Aug. 19, 1914 |